Aug. 29, 1961 J. V. CARLISLE ET AL 2,997,780
APPARATUS FOR CELL CONSTRUCTION
Filed April 17, 1959 7 Sheets-Sheet 1

JIG A
FIG 1

JIG B
FIG. 7

Aug. 29, 1961  J. V. CARLISLE ET AL  2,997,780
APPARATUS FOR CELL CONSTRUCTION
Filed April 17, 1959  7 Sheets-Sheet 5

United States Patent Office 2,997,780
Patented Aug. 29, 1961

2,997,780
APPARATUS FOR CELL CONSTRUCTION
James V. Carlisle, Baton Rouge, La., and Theodore M. Arnold, Punta Gorda, Fla., assignors to Ethyl Corporation, New York, N.Y., a corporation of Delaware
Filed Apr. 17, 1959, Ser. No. 807,142
2 Claims. (Cl. 29—203)

This invention pertains to a new and novel apparatus for the construction of electrolytic cells and in particular is concerned with an apparatus to be employed in the construction of a collector-collector support frame-diaphragm sub-assembly for such cells. This application is a continuation-in-part of application Serial No. 493,156, filed March 9, 1955, now Patent No. 2,912,750, granted November 17, 1959.

The manufacture of sodium and other alkali metals is carried out in an electrolytic cell which is basically similar to the Downs cell described in U.S. Patent 1,501,756. Briefly, the cell includes a housing containing one or more anodes each of which is surrounded by a cylindrical cathode. In the annular space between an anode and the surrounding internal surface of the cathode is positioned a foraminous diaphragm supported from above by what is commonly referred to as the collector. The collector, or collector portion corresponding to a single anode comprises an outlet port for removal of the gaseous halogen and an annular inverted channel for manifolding and removal of the alkali metal. This collector is supported by a frame which in turn is attached to and supported by the cell housing.

The concentricity and vertical disposition of the anodes with the surrounding diaphragm and cathode surface is an important attribute of a properly constructed cell. Attaining this objective has been a long standing problem in the industry. Inherent difficulties in the construction of these cells has been the lack of a suitable method for positioning the cathode, with respect to the anode, and for positioning the diaphragm located in the annular space between each anode and cathode. Because of the fact that the cathode and the diaphragm surround substantially the entire length of the anode, it is quite difficult to position the diaphragm in between the cathode and anode within proper tolerances so as to provide the most efficient construction of the cell for operation. This can be appreciated when it is noted that ordinarily the lateral distance between the anode and cathode is of the order of only 1½ inches and for best operation the diaphragm must be inserted equidistant from the anode and cathode over the entire length of the anode, which is about 3 to 4 feet or more in length. Prior methods employed for achieving this result have not been adequate. The inadequacy has been shown chiefly in erratic and highly variable life of cell diaphragms. This has caused frequent undesirable replacement. In addition cell life proper has been variable, sometimes requiring premature reconstruction. Such reconstruction, in addition to being expensive, also results in reducing production capacity of a plant. A plant installation consists of a relatively large number of cells occupying specific floor positions or "stalls." When a cell is necessarily replaced it unfortunately cannot be merely lifted from the production space or "stall" occupied, but must be torn down and rebuilt. During the time required for this dismantling and building of a new cell, the production space is, of course, unused.

Until the present invention, the techniques in cell building left much to be desired, as above explained. Consequently, it is an object of the present invention to provide apparatus for the rapid and accurate construction of a sub-assembly for an electrolytic cell. A further object of this invention is to provide apparatus for constructing the sub-assembly for an electrolytic cell which will provide a cell having a longer life, higher efficiency, and increased productivity. A particular object of this invention is to provide apparatus for gaging collectors for cells having four anodes and particularly for determining the collector port dimensions and their symmetry according to a desired plan, and also their relationship to other cell components within desired tolerances. A further object is to provide apparatus for gaging a collector and for the assembly thereof to a collector support frame and diaphragm assemblies to form a subassembly for precise insertion into the lower portion of a cell, said sub-assembly bearing a precisely predetermined spatial relationship thereto. A specific object is to provide apparatus for assembling the collector to the collector frame in accurate alignment so that when inserted into the cell housing, proper positioning of a multi unit cathode with respect to the anodes and the diaphragms is within prescribed tolerances. A further object is to furnish apparatus which provides a further gaging of a collector for determining its suitability for reception of diaphragms, and also for locating a set of diaphragms by a predetermined pattern and assembling to a collector-collector support frame sub-assembly.

The above and additional objects of this invention are provided by the apparatus described herein. The apparatus includes a device for gaging a collector with respect to the symmetry of a plan disposition of four cylindrical collector ports therein, and concurrently for the lateral and vertical orientation of the collector with the collector support frame for the establishment of a cell sub-assembly. This apparatus is desirably employed in combination with a second apparatus which provides a secondary gaging of the collector, particularly with respect to the roundness of the collector ports, and further for concurrently positioning, in lateral and vertical alignment, a set of diaphragms and for their assembly to form a collector-collector support frame sub-assembly.

It has been found that the apparatus of this invention, when used in combination, provides an efficient means for the construction of an electrolytic cell sub-assembly whereby the criticality of the positioning of the cathode with respect to the anodes, and the diaphragms with respect to the cathode and anodes, is achieved. The apparatus, particularly the use of the combination, eliminates incorrect alignment of these integral parts which results, for example, in the burning of the diaphragms causing loss of production and necessitating dismantling for reconstruction. Further, the efficiency of the cell is considerably increased as evidenced by the fact that production is increased for a given current input. In addition, the average life of the diaphragms is appreciably increased, thereby reducing loss in production time.

The apparatus is capable of assuming a variety of forms which will be readily understood from the details described below and the accompanying figures, including

The sequence of assembly operations includes assembly of a collector and collector support frame to form a sub-assembly, and then the addition of diaphragm screens to that sub-assembly to form a completed collector-collector support frame-diaphragm sub-assembly which is the major upper portion of a cell. More specifically the assembly operations involves firstly for the gaging of a collector, and then for the combining of a collector and collector support frame into a sub-assembly, using jig A. The collector of this sub-assembly is further gaged, and then fitted with a set of diaphragms by the use of another apparatus jig B, whereby there is then formed a complete collector-collector frame-diaphragm assembly. This assembly can then be combined with the base assembly to form a completed cell.

Figure 1:
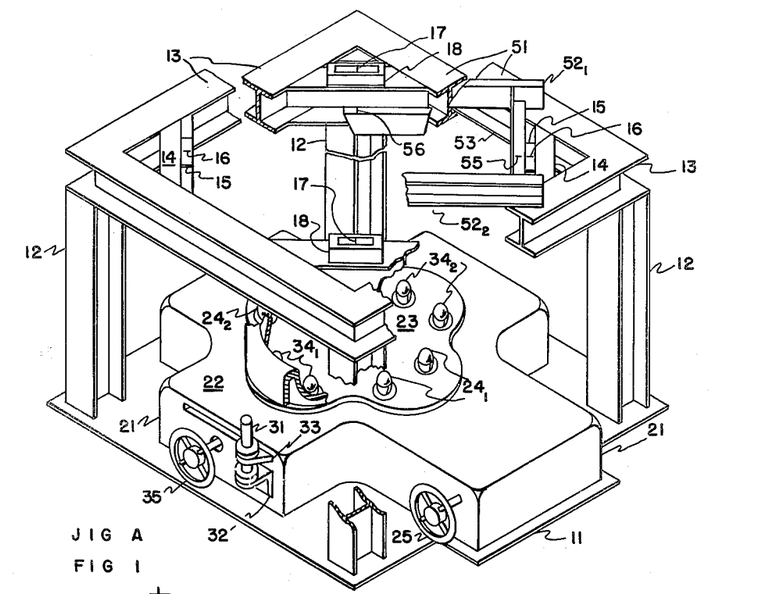
FIGURE 1 is an isometric view of apparatus for positioning the collector to the collector frame, and forming a cell subassembly, this apparatus hereinafter being called "jig A," the figure having cutaway portions for the purpose of clarity and for showing a portion of the collector and collector support frame in position.
Figure 2:
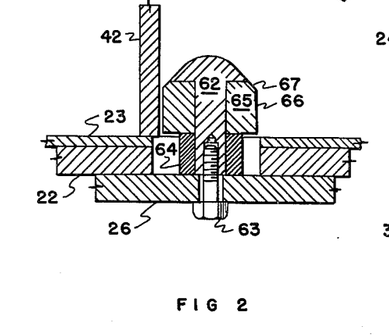
FIGURE 2 is a sectional elevation of one of a plurality of bosses, a pair of such bosses forming a locator and a portion of the jig A.
Figure 3:
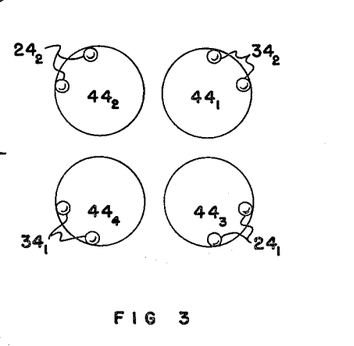
FIGURE 3 is a schematic plan view illustrating the action of the above mentioned locators of jig A in positioning, gaging and registering a collector for assembly into a collector-collector frame sub-assembly.
Figure 4:
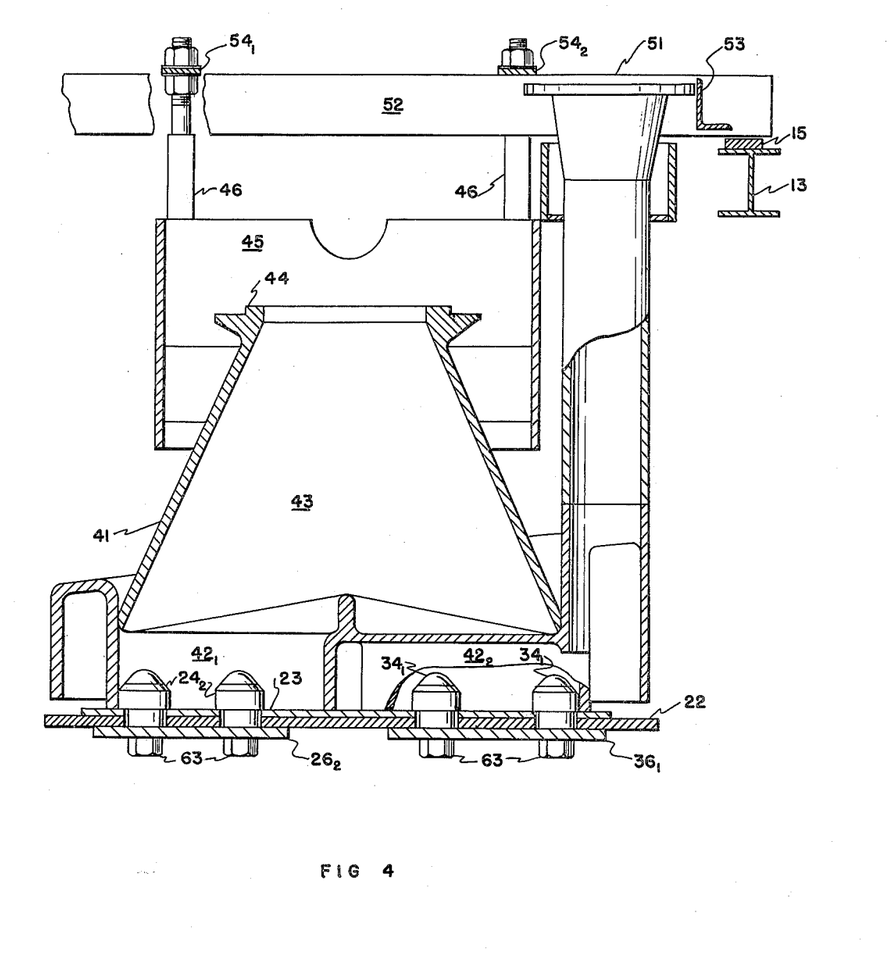
FIGURE 4 is a partially sectioned elevation depicting the collector-collector support frame sub-assembly positioned in jig A.

The details of construction and operation of jig A, for gaging a collector and establishing the sub-assembly of collector and collector support frame, are given in FIGURES 1-4, inclusive. FIGURE 1 is an isometric partially sectioned view of the jig A, a segment of a collector in operative relationship to the jig being shown. FIGURE 2 is an elevation showing a cross-section of a collector, and a collector support frame in operative relation to elements of jig A, and FIGURES 3 and 4 are sectional detail illustrations of certain elements of jig A.

Referring to FIGURE 1, jig A is shown, this jig including a base 11 and a superstructure including a plurality, generally four, of upright columns 12 which rigidly support a horizontally disposed frame 13. Attached to and forming part of the jig base 11 is a collector aligning mechanism 21. The aligning mechanism 21 includes mechanism hereafter described. A bearing plate 23, corresponding generally in outline to the outline of the bottom of a collector is centrally and rigidly attached to the upper surface of the housing 22. The surface of the bearing plate 23 is in a plane paralleling the plane of the upper surface of the superstructure frame 13, and more specifically, the plane defined by registration plates 15 attached to numbers of the superstructure frame 13.

Projecting through openings in the bearing plate 23 are two sets, of two each, of locators, these locators $24_1$, $24_2$, $34_1$, $34_2$ each being a pair of lugs or bosses as later described. Each set of locators thus consists of two pairs of two bosses each, and therefore each locator defines a rectangle in a horizontal plane. The two locators of each rectangle are capable of limited movement hereafter more explicitly defined. Generally, however, one set of locators (bosses $24_1$, $24_2$) are adapted to engage the outward walls of one diagonal pair of cylindrical ports or openings of a collector. This is termed the unidirectional set. The other set of locators (bosses $34_1$, $34_2$), termed the bidirectional set, are adapted to engage by generally outward movement, the outward walls of a second diagonal pair of collector ports.

Mechanism hereafter described is provided for movement of the pairs of bosses in each set toward or from the center of the bearing plate 23. An operating wheel 25 provides for actuating the mechanism for providing movement of the locator bosses $24_1$, $24_2$ of the unidirectional set. Movement of one pair is accompanied by an equal and corresponding movement of the other pair of the set. In other words, movement of the bosses $24_1$, of one pair toward the center of the bearing plate is accompanied by an equal movement of the bosses $24_2$ of the opposite pair toward the center. Thus, it is seen that the bosses $24_1$, $24_2$ of the unidirectional set always define a rectangle having a fixed center, a constant width and a variable length.

With respect to the bosses $34_1$, $34_2$ of the bidirectional set, an operating wheel 35 provides for actuating mechanism providing movement of the pairs of bosses $34_1$, $34_2$ to or from each other as the case may be. It is seen that the bosses $34_1$, $34_2$ of the bidirectional set always are located on the corners of a rectangle having a constant width. However, the long dimensions of the rectangle so defined can be at a variable angle to the long dimension of the rectangle defined by the bosses $24_1$, $24_2$ of the unidirectional set. Further, the center of the bidirectional bosses $34_1$, $34_2$ rectangle is movable, and may or may not coincide with the center of the rectangle of the unidirectional boss rectangle.

The disposition of the rectangle defined by the centers of the bidirectional bosses $34_1$, $34_2$ is visually indicated, and made available for a size and alignment check by an extension 33 projecting through the side of the housing 22. The extension 33 has a machined hole for loosely receiving a tolerance pin 31. A bracket 32 mounted generally below the extension and rigidly to the side of the housing 22, also has a machined hole therein for snugly receiving the pin 31. Accordingly, passage of the tolerance pin through the opening in the extension 33, and reception in the hole in the bracket 32 means that the general disposition of the bidirectional bosses $34_1$, $34_2$ with respect to the unidirectional bosses $24_1$, $24_2$ is constant within a certain tolerance range. The center line of the pin 31 in position in the receptacle provided in the angle 32 is, in effect, a fixed reference point to which the other portions of the jig A, and the parts of the sub-assembly established with the figure, bear an explicit relation.

The functioning of the two sets of bosses is further illustrated by FIGURE 3 which is a schematic plan view showing the position of the sets of bosses $24_1$, $24_2$, $34_1$, $34_2$ in operative contact with the wall surfaces of the circular ports of a collector. It will be seen that each of the two sets of bosses are adapted to engage by outward movement the walls of a diagonal pair of the ports of a collector.

The superstructure of the jig A includes a frame 13 having special corner members 14 on which are permanently mounted registration plates 15. An indexing mark 16 is scribed on each of the registration plates 15. The operative relation of a collector support frame 51 to the jig frame 13 and registration plates 15 is shown in part by FIGURE 4 and in part by FIGURE 1. Referring to FIGURE 4, a collector casting 41 is shown in partial section, resting on the bearing plate 23 of the jig A. The collector casting includes four ports, the walls $42_1$, $42_2$ of two of the ports being shown. The ports open into a central dome 43 which terminates in a flanged opening 44 for connection, in an operating cell to a chlorine duct. The dome 43 is permanently attached to ring member 45 which is attached to four vertical support members 46, having a threaded portion at the upper end thereof.

The collector support frame 51 includes two long channel members 52 and two cross members 53, the cross members being suitably angle irons set in slightly from the ends of the channel members. The support members from the ring member are attached to the collector support frame by bolting to supplemental cross members 54. When a collector-collector support frame is properly assembled within the jig A, a constant clearance is measurable between the underside of the ends of the channel members 52 and the registration plates 15. Further orientation of the collector support is provided by registration marks 55 in the frame cross members 53, and similar marks 56 in the webs of the channel members 52. These latter are aligned with registration marks 17 on "pillow blocks" 18 mounted on the jig frame and defining a line at right angles with a line between the registration marks 16 on the opposite corners of the jig.

In using jig A to establish a sub-assembly of a collector and collector frame, the operator first provides, through hand-wheel 25 inward movement of the bosses of the unidirectional set to their stopping point. Next, with pin removed, bosses $34_1$, $34_2$ of the bidirectional set are moved inwardly to their stopping point by operation of hand-wheel 35. The collector, with the collector support frame loosely attached thereto by the support bolts, is then lowered on to the bearing plate 23. The operator then moves the bosses $24_1$, $24_2$ of the unidirectional set outwardly to make contact with the inner surface of two of the collector outlet ports. This operation locates these two collector port walls generally equidistant from the center of the jig A (the boss pairs of this set being movable only equidistant from the jig center) and also thus positions generally the collector on a line coinciding generally with a line equidistant between the bosses of each pair of the set. Thus, referring to FIGURE 3, it is seen that first the collector is adjusted and positioned by the action of the unidirectional locator $24_1$, $24_2$ or sets of bosses. Outward movement of the boss pairs in this set provides lateral shifting of the collector until tangential contact is made by the collector port walls with each of the four bosses $24_1$, $24_2$. Then the operator, by rotating hand-wheel 35, causes outward movement of the bidirectional bosses $34_1$, $34_2$ this movement being continued until further movement is prevented by contact of at least three of the bosses against the collector port walls. Referring to FIGURE 3, it will be seen that if the collector ports define perfect circles, and these circles are centered on the corner of a perfect square, then all four bosses $34_1$, $34_2$ of the bidirectional set will engage the collector port walls. In addition, the long dimension of the rectangle formed by the bidirectional bosses will be precisely at right angles to the long dimension of the rectangle defined by the unidirectional bosses $24_1$, $24_2$. On the other hand, if the above mentioned desired relationships of the collector ports do not exist owing to warpage of the collector, when any of the bidirectional bosses $34_1$, $34_2$ make contact with a collector port wall, further outward movement will be normally accompanied by rolling movement along the wall and radial shifting, and possibly lateral shifting, of the rectangle defined by the bidirectional bosses. By lateral shifting is meant that the long axis of the rectangle defined by the bidirectional bosses $34_1$, $34_2$ is shifted to a different bisecting point with respect to the rectangle defined by the unidirectional bosses $24_1$, $24_2$. This lateral shifting may also be accompanied by a change in the angle of intersection of the long axes of the rectangles. This shifting is, of course, reflected in the position of the extension 33.

It is seen that the position of the extension 33 provides, by reference to the bracket 32, an integrated indication of the position of the rectangle defined by the bidirectional set of bosses relative to the rectangle defined by the unidirectional set. This indication integrates lateral, lineal and angular position of the two said rectangles in the horizontal plane. A rapid tolerance determination based on this integrated indication is possible with the pin 31. The pin is inserted through the hole in the extension 33, and if it is possible to insert the pin 31 further into the receptacle in the bracket 32, it is established that the collector is properly aligned and meets the required port location specifications. If the pin is thus received in the receptacle in the bracket 32, the collector frame is rigidly secured to the collector with the reference marks 16, 55, 17, 56 already mentioned being properly registered.

Figures 5, 6:
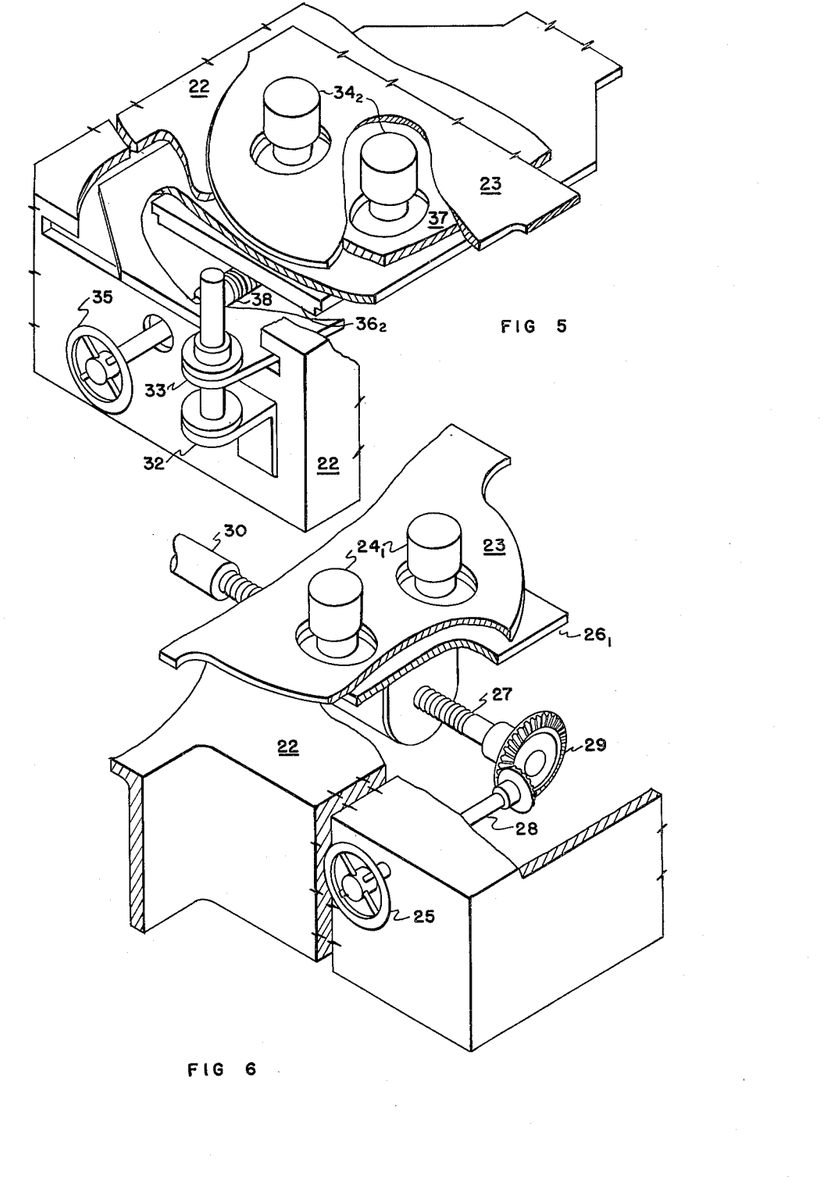
FIGURES 5 and 6 are isometric, partially sectioned and disengaged views of portions of the operative mechanism forming part of the jig A.

FIGURE 6 is an enlarged, partially sectioned view of one pair of bosses $24_1$ of the unidirectional bosses and operating mechanism therefor, forming a portion of jig A. Referring to FIGURE 6, the pair of bosses $24_1$ are slidably mounted on a movable plate $26_1$. The movable plate $26_1$ is supported by slides, not shown, attached within the housing 22. Rotation of the hand-wheel 25 causes rotation of a threaded shaft 27 by actuating a stub shaft 28 and a bevel gearset 29. Movement of the threaded shaft 27 along its axis is prevented by a double thrust bearing, not shown, engaging the shoulder of an enlarged section 30 of the threaded shaft 27. The other pair of bosses $24_2$, not shown, also operatively engage a threaded section of the shaft 27, the thread lead being opposite in direction but of equal pitch to the threaded portion actuating movement of the opposite boss $24_1$ pair. Thus rotation of the hand-wheel 25 causes equal movement of the boss pairs $24_1$, $24_2$ in opposite directions.

The mechanism for actuation of the bidirectional bosses $34_1$, $34_2$ is illustrated by FIGURE 5, this figure being an isometric sectional view of a portion of the collector aligning mechanism 21. Referring to FIGURE 5, one pair $34_2$, of the bidirectional bosses is shown. The bosses $34_2$ are attached to a slidable plate $36_2$, supported adjacent to a support plate 37 by slides not shown attached to the support plate 37. Movement of the slidable plate $36_2$ is provided by rotation of a threaded shaft 38 which extends through the wall of the housing 22 and is fastened to the operating wheel 35. The support plate 37 supports also a second slidable plate not shown which in turn conveys a second pair of bidirectional bosses $34_2$. The support plate 37 is mounted within the housing by bearing support means not shown which permits limited rotational movement, and lateral and lineal movement, all in a horizontal plane. From the foregoing it is seen that outward movement of the boss $34_1$, $34_2$ pairs can be accompanied by a shift in the disposition of the rectangle defined by the bosses with respect to its angle to the unidirectional boss rectangle and also with respect to the position of its center relative to the invariant center of the rectangle defined by the unidirectional bosses.

From the foregoing, it will be seen that, in operation, the bosses $24_1$, $24_2$, $34_1$, $34_2$ will normally go through limited movement along the walls of the collector ports. This movement may be by sliding contact, but it has been found that rolling contact is particularly effective and desirable. A preferred design for the bosses is illustrated in FIGURE 2, this figure being a sectional elevation of an embodiment of a boss providing frictionless rolling contact. Referring to FIGURE 2, the boss assembly includes a pedestal 62 which is mounted upon the slidable plate 26 and attached thereto by cap screw 63. A collar 64 is positioned by the shank of the pedestal 62. The top of the pedestal 62 has preferably a rolled crown as shown. A roller 65 is positioned by the pedestal and supported by the collar 64, the lowermost surface 66 of the roller is positioned slightly above the top level of the bearing plate 23. The wall 42 of the collector port engages the periphery of the roller 65. A chamfer 67 on the upper portion of the roller 65 is an extension of the outline of the crown of the pedestal 62. This continuity of outline is beneficial in several respects. In lowering the collector casting in place, this inclusion facilitates placement. In addition the disposition of the extremities of the pedestal crown from the roller periphery assures that rolling contact is maintained in aligning the collector despite the occasional presence of minor surface protrusions.

Figure 7:
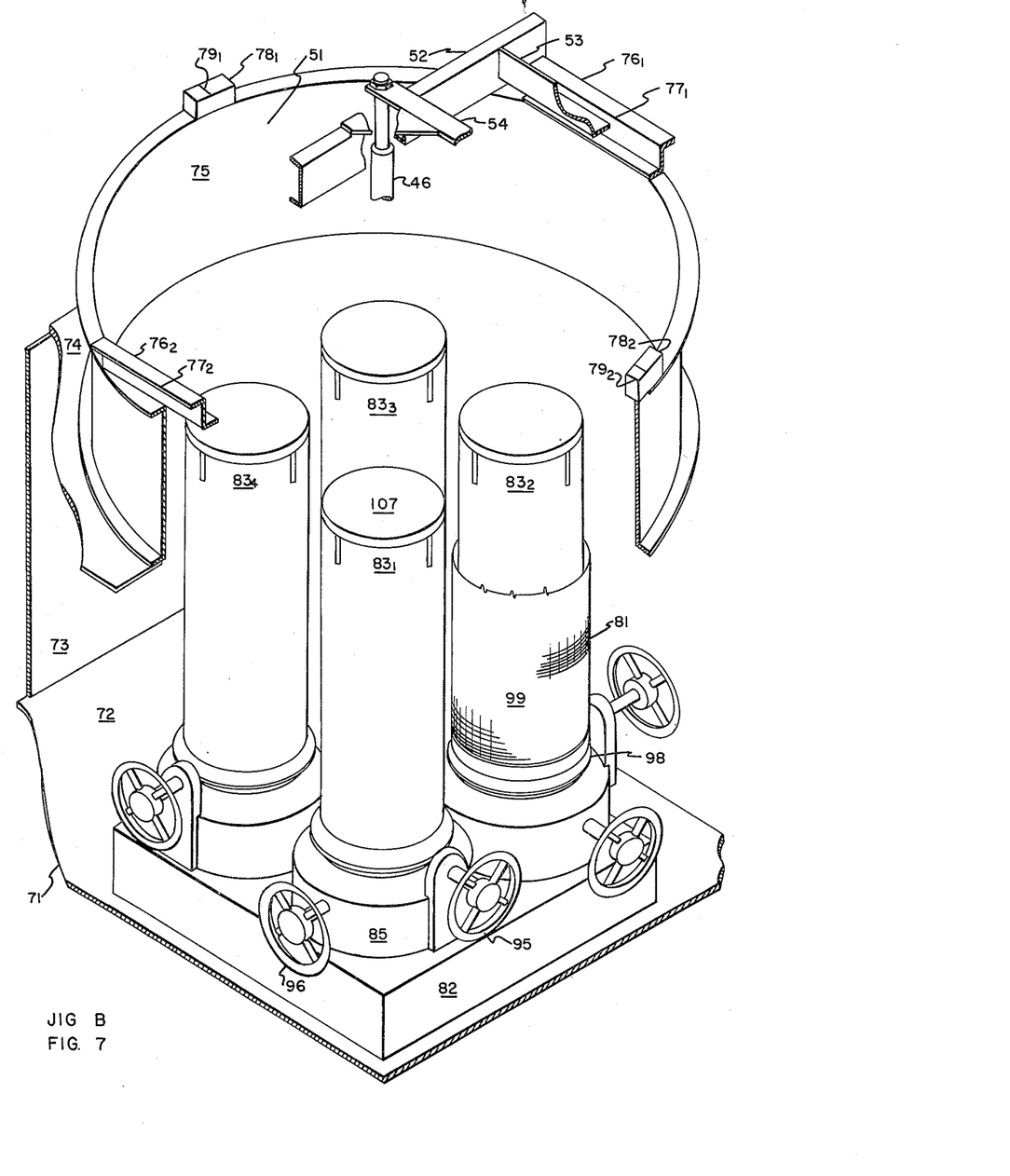
FIGURE 7 is an isometric partially sectioned view of apparatus, which is termed herein "jig B," for further gaging of the collector and for positioning the cell diaphragms to the collector-collector frame sub-assembly, this figure showing a portion of the collector support frame in operative position.
Figure 8:
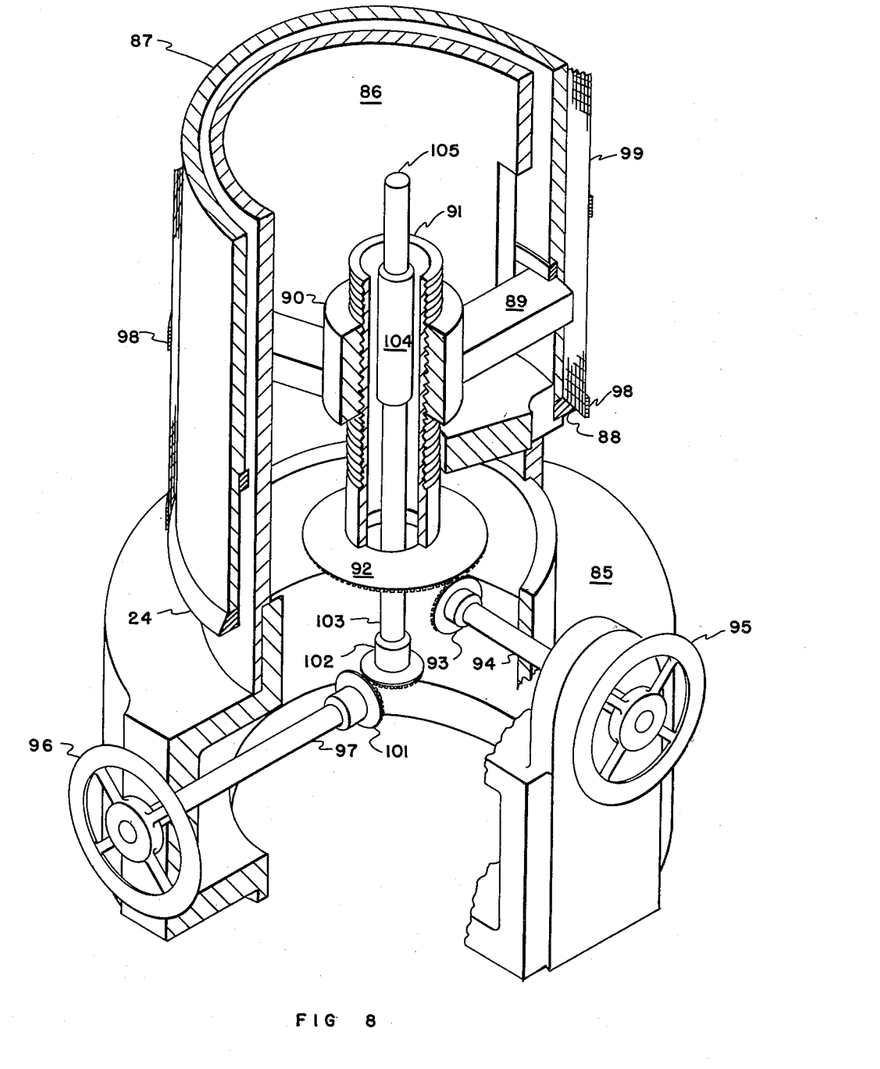
FIGURE 8 is a detailed isometric sectioned view of a portion of the mechanism of a "dummy anode" forming a part of jig B, showing a diaphragm in operative position.
Figure 9:
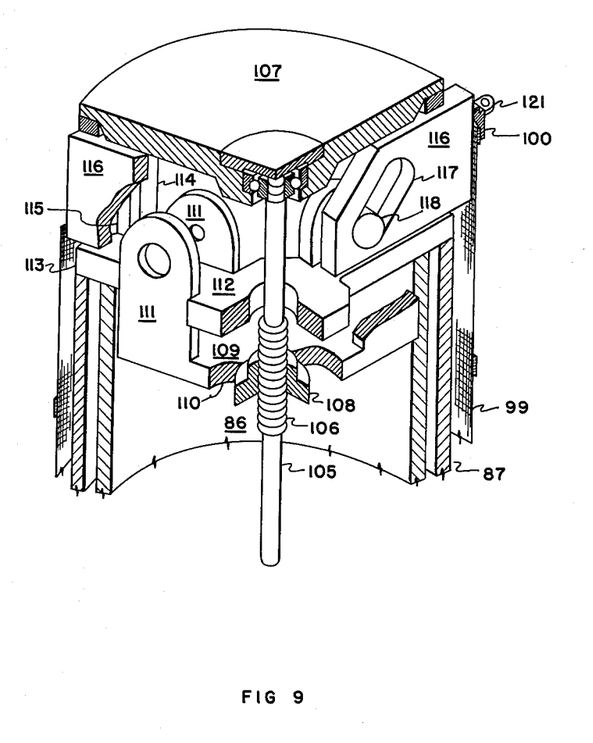
FIGURE 9 is an isometric, partially sectioned view showing the upper portion of the operative mechanism of the dummy anode depicted in FIGURE 8.

Upon completion of the collector-collector frame sub-assembly as above described, it is available for addition of the diaphragms to complete the major upper portion of a cell assembly. A particularly effective apparatus for the further gaging of the collector ports and for attaching the diaphragms in proper vertical and lateral orientation with regard to the collector-collector frame sub-assembly is jig B. This jig B is shown in FIGURE 7. A detail of a portion of one of the four dummy anodes $83_1$, $83_2$, $83_3$, $83_4$, forming part of jig B, is shown by FIGURE 8. A further detail of an upper portion of a dummy anode is shown in FIGURE 9.

A partially sectioned isometric view of jig B is given by FIGURE 7. Referring to FIGURE 7, the major components of jig B include an immovable enclosing frame structure 71, said frame including a base 72, rigid side walls 73 or columns, and an upper level plate 74. In this particular embodiment the upper level plate 74 supports a rigidly affixed ring member or ring frame 75 corresponding in diameter to the shell of a completed cell. Attached to the ring frame 75 are two support members or Z-bars $76_1$, $76_2$ diametrically opposite, and having scribed registration marks or notches $77_1$, $77_2$. In addition to the registration notches $77_1$, $77_2$ in the Z-bars $76_1$, $76_2$, a second pair of registration marks $79_1$, $79_2$ is provided on a line at right angles to the line defined by the primary registration notches $77_1$, $77_2$. The secondary registration marks $79_1$, $79_2$ are scribed on machined pillow blocks $78_1$, $78_2$ attached to the upper surface of the ring member 75.

The jig B includes a diaphragm aligning mechanism 81. This apparatus includes a base or foundation portion 82 upon which is rigidly mounted a set of four diaphragm aligners or dummy anodes $83_1$, $83_2$, $83_3$, $83_4$. In plan, these dummy anodes are centered on the corners of a square having a center corresponding identically with the point of intersection of the lines established by the pairs of registration marks $79_1$, $79_2$ and registration notches $77_1$, $77_2$ above the ring member 75. In addition to being positioned as indicated in a horizontal plane, the dummy anodes 83 are positioned with precise vertical alignment.

Description of the operative details of one of the dummy anodes 83 will be of value before describing the use and overall operation of jig B. FIGURE 8 is a partially sectioned isometric elevation of a lower portion of a dummy anode showing some of the operating mechanism incorporated therein, and a segment of a diaphragm 99. Referring to FIGURE 8, the principal elements of a dummy anode include a base member 85, an inner cylindrical member 86, rigidly mounted on the base member 85, and an outer cylindrical member 87 corresponding approximately in dimensions to an anode in a completed cell. Rigidly affixed to the outer cylinder 87 at about the lowest extremity thereof is a bevelled collar 88, which serves as a supporting shoulder for a cylindrical diaphragm 99, supported on a ferrule or reinforcing ring 98.

The outer cylinder 87 is supported by arms 89 which are attached to a threaded collar 90, engaging a threaded sleeve 91. The threaded sleeve is supported and laterally positioned on a bearing, not shown, and is attached to a ring gear 92. A shaft 94 is journalled in the base member 85 and supports a pinion gear 93 which meshes with the ring gear 92, rotation being caused by a handwheel 95 mounted on the external end of the shaft 94. It will be seen that rotation of the shaft 94 by the handwheel 95 will cause rotation of the ring gear 92 and the threaded sleeve 91, which will in turn result in vertical displacement of the outer cylindrical member 87. In addition to the described mechanism for providing vertical movement of the outer cylinder 87, separate mechanism is provided for transmitting rotary motion to aligning means in the upper portion of a dummy anode, said means being described hereafter. This mechanism includes a second hand wheel 96 operating a stub shaft 97 which mounts or supports a bevel pinion gear 101. The stub shaft is positioned by stationary bearings, not shown. A bevel pinion gear 102 mates with the primary gear 101, and is keyed to a centrally positioned shaft 103. The shaft 103 terminates with an internally splined section 104 which mates with a splined end of a shaft 105, this shaft extending to the top portion of the dummy anode 83. These shafts 103, 105 are journalled by bearing means not shown. It is seen that rotative motion can be applied to the vertical shaft 105 concurrently with vertical motion.

The above described mechanism in the lower portion of the dummy anode serves to laterally position the lower end of a diaphwragm 99 and also to raise a diaphragm to a desired elevation. In addition, means in the upper portion of a dummy anode provide for lateral registration of the upper extremity of a diaphragm. These means are illustrated by FIGURE 9, which is a partially sectioned isometric elevation of the upper portion of a dummy anode 83.

Referring to FIGURE 9, the upper portion of a dummy anode 83 is shown and includes a cap plate 107, the extremities of the inner cylinder 86, the outer cylinder 87, and a portion of a splined shaft 105. A segment 106 of the splined shaft 105 engages and supports a threaded collar 108, which is press fitted into a shouldered recess in a three membered spider 109. The spider includes three arms 110. Extending upwardly at the ends of the spider arms 110 are two pins supports 111, the outer edges of the pin supports 111 making sliding contact with the inner wall of the inner cylinder 86. A stationary spider 112, positioned directly above the movable spider 109, has corresponding arms 113 extending through notches 114, 115 in the inner cylinder 86 and the outer cylinder 87, respectively. It should be noted that this spider 112 is stationary with respect to the outer cylinder 87, which is, as already noted, movable vertically.

Resting on the stationary spider arms 113, and slidable in a bearing space provided by the spider arms 113, the cap plate 107, and the slots 115 in the outer cylinder 87 are three aligning blocks 116, provided with inclined slots 117 at the inner ends. Retainer pins 118 passing through holes in the pin supports 111 position the aligning blocks 116 with respect to displacement from the center of the assembly. It will be seen that rotation of shaft 105 causes vertical movement of the threaded collar 108, movable spider 109, pin supports 111 and retainer pins 118. Upward movement of this assembly results in equal retraction of the aligning blocks 116 from the outside toward the shaft 105. Downward movement of the movable spider assembly causes equal outward movement of the aligning blocks. In operation, a diaphragm 99, having a top ferrule 100 is slipped over the dummy anode, and the aligning blocks 116 are moved outwardly until contact is made with the inner surface of the ferrule 100, the diaphragm being thus laterally positioned at the top.

Figure 10:
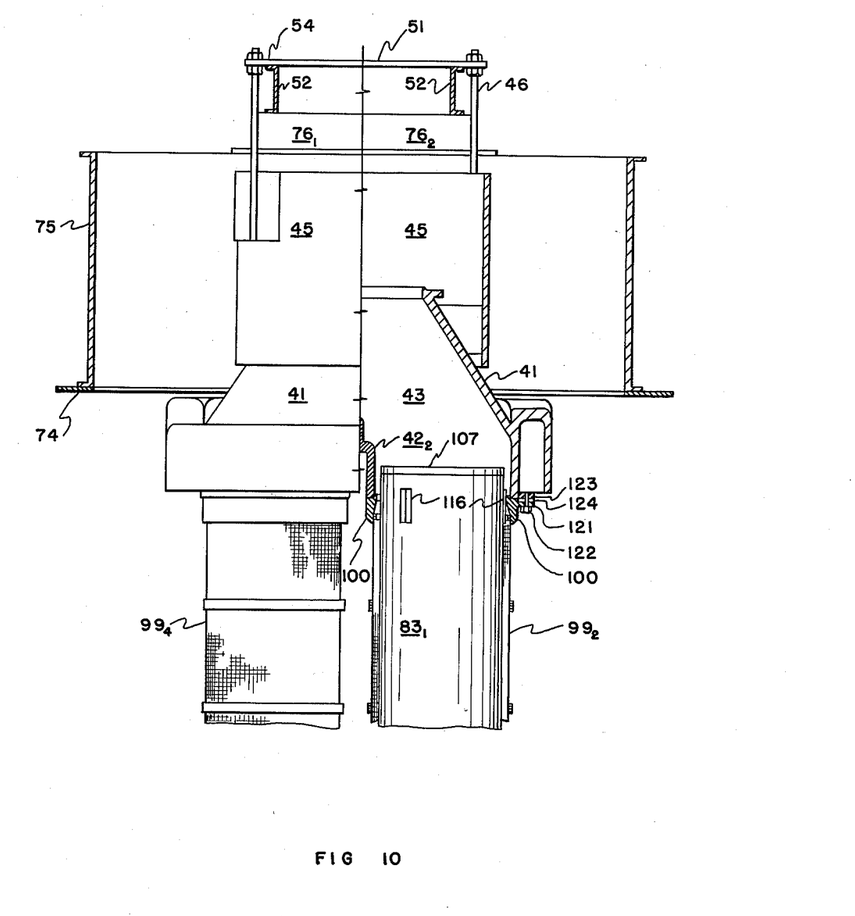
FIGURE 10 is a partially sectioned, elevation view of the assembly of diaphragms with the collector-collector support frame sub-assembly, shown in operative position in jig B.

From the foregoing, and adverting again to FIGURE 7, it is seen that jig B provides for lateral and vertical positioning of the diaphragms of a cell, operating firstly on the bottom of a diaphragm, and in addition, laterally positioning the top of the diaphragm. These operations provide alignment of the diaphragms of the cell in a predetermined relationship one to the other and also with reference to the collector and collector frame sub-assembly, and attachment of the diaphragms thereto is made using jig B. The interrelation of the diaphragms 99 and the collector-collector frame sub-assembly in jig B is shown by FIGURE 7 and FIGURE 10. Referring to FIGURE 7, a segment of a collector support frame 51 is shown, resting on the support bar 76. Further relationship of the collector-collector support frame sub-assembly and jig B is shown by FIGURE 10, this figure being a partially sectioned elevation showing a sectional view of a collector support frame 51 in place above the ring frame 75 of jig B, and supporting the collector 41. A portion of the collector casting 41 is shown in section, illustrating the mode of establishing connection between a diaphragm 99 and the collector. In establishing this assembly, the lower end of the diaphragm 99 is laterally positioned by the engagement of the band 98 with the bevelled collar 88. The aligning blocks 116 in the upper portion of the dummy anode $83_2$ are then extended to laterally position the diaphragm ferrule 100. The outer cylinder 87, with the thus horizontally and vertically located diaphragm is then raised into the collector port so that the diaphragm ferrule 100 can establish initial contact with the bottom of a collector port wall. This operation permits a secondary gaging of the collector, this time with respect to the roundness of the individual collectors. If the outer cylinder 87 and the aligning blocks 116 cannot be inserted into the ports and if full circumferential contact is not possible with each diaphragm ferrule, the collector is rejected. The diaphragm ferrule is then fastened to the collector by a plurality of cap screws 122 inserted through a lug 121 and engaging a tapped hole in a boss or lug 123 projecting from the collector port wall $42_2$. The aligning blocks 116 are then retracted so that the collector-collector support frame-diaphragm assembly can be lifted from jig B when desired.

In those instances in which the lateral plane of the diaphragm 99 is at exactly right angles to the center line of the diaphragm cylinder, the diaphragm ferrule 100 will engage the entire periphery of the collector port wall $42_2$. Frequently, however, this precise relationship does not exist and compensating means are necessary to prevent stress and deformation of the diaphragm ferrule 100 and consequently deformation of the diaphragm screen proper. Accordingly, tapered washers 124 are provided for insertion between the ferrule lugs 121 and the mating lug 123 on the collector port wall. These washers take the major thrust of the cap screws 122 and prevent the deformation mentioned.

The foregoing thus describes the use of the apparatus of the invention or the preparation of collector-collector frame sub-assembly and the assembly of that sub-assembly with the diaphragms, thus forming a unit adaptable for precise insertion into a previously built cell base with anodes.

In a careful comparison of the performance of a group of cells constructed with the apparatus of our invention with performance of a group constructed according to previous methods it was found that the former group provided an increase of approximately 1.5 percent in current efficiency. In addition, it was found that the average effective life of the former group of cells was a significant improvement over the preceding practice, particularly with respect to the diaphragm life. Since the cost of construction of cells with the present apparatus is substantially the same as by the former practices, it is apparent that our apparatus is highly beneficial and economical.

Having described the apparatus of our invention in some detail and the manner of its use, what we claim is:

1. Apparatus for gaging-assembly of a collector-collector support frame-diaphragm assembly for a fused salt electrolysis cell including a first apparatus for gaging a collector and assembly of a collector and a collector support frame into a sub-assembly, the collector having four cylindrical ports opening in the lower face thereof and centered on the corners of an approximate square, and a second apparatus for further gaging the collector and for assembly of the diaphragms to the said sub-assembly; the said first apparatus comprising: a fixed base having alignment means including a bearing plate, to which is associated locator mechanism, and a casing and indicator means as defined hereinafter, said casing including a top horizontal member for supporting the collector, and unidirectional and bidirectional locator mechanisms, each locater mechanism including at least two contacts spaced apart horizontally and projecting above the said bearing plate through apertures permissive of horizontal movement of said contacts, for contacting the walls of the ports of a collector when in position on the horizontal plate, the unidirectional locator mechanism including means for linearly moving the contacts thereof on a straight fixed line in opposite directions and equally in unison, whereby outward movement of the contacts can engage the outward walls of a diagonal pair of collector ports and uniformly position the collector with respect to the said fixed line, the bidirectional locator mechanism including a horizontal support plate slidably supported adjacent the said bearing plate, the contacts being slidably supported on said plate, and means for linearly moving the contacts in a straight line in opposite directions and equally in unison; the said line having a normal position intersecting the fixed line of the unidirectional locator mechanism at the mid-point of and at right angles thereto, but angularly and horizontally shiftable from said normal position with movement of the support plate, whereby outward movement of the contacts and engagement with this outward wall of the second diagonal pair of collector ports provide horizontal and angular location of the slidable support plate with respect to the fixed line of the unidirectional locator mechanism and the mid-point thereof, the indicator including a fixed position element and a movable element, the movable element being operatively attached to the slidable support of the bidirectional locator mechanism at a position remote from the center thereof, the movable element being vertically aligned with the fixed element when the bidirectional locator mechanism is normally positioned, whereby horizontal and angular displacement of the bidirectional locator mechanism is indicated by displacement of the movable element from said vertical alignment; the second apparatus comprising a foundation upon which is rigidly mounted diaphragm aligners, and immovable enclosing supporting structure including rigid side walls and a level plate above which is mounted an upper ring frame, diaphragm aligners including four members for vertically aligning and horizontally locating the diaphragms, a top horizontal ring frame above said diaphragm aligners and supporting structure for said ring frame, supports attached to said frame for receiving and supporting the collector-collector support frame sub-assembly by engaging the ends of the collector support frame, said supports defining a horizontal plane and two pairs of registration marks in said frame defining the intersection of two vertical planes having a fixed relationship to the horizontal placement of the diaphragm aligner whereby a completed collector-collector support frame sub-assembly can be laterally and vertically aligned for assembly and for the succeeding gaging and aligning steps; each diaphragm aligner including a vertically movable horizontal frusto-conic section converging upwardly and adapted to support a diaphragm by engaging the bottom extremity thereof, and centering blocks defining a horizontal circle of varying diameter in a plane above the said frusto-conic section, the distance of said plane above the frusto-conic section being equal to about the length of a diaphragm, whereby a diaphragm can be elevated, and its bottom and top portions horizontally positioned by said frusto-conic section and said centering blocks respectively, and mechanism for elevating the said frusto-conic section and for providing radial movement of the said centering blocks in unison.

2. Apparatus for gaging-assembly of a collector-collector support frame-diaphragm assembly for a fused salt electrolysis cell including a first apparatus for gaging a collector and assembly of a collector and a collector support frame into a sub-assembly, the collector having four cylindrical ports opening in the lower face thereof and centered on the corners of an approximate square, and a second apparatus for further gaging the collector and for assembly of the diaphragms to the said sub-assembly; the said first apparatus comprising: a fixed base having alignment means including a bearing plate, to which is associated locator mechanism, and a casing and indicator means as defined hereinafter, said casing for supporting the collector including an upper horizontally disposed frame having the shape of a parallelogram supported at the corners by vertical members, a centrally mounted bearing plate corresponding generally in outline to the bottom of a collector, and having openings through which are projected contact portions of unidirectional and bi-directional locator mechanisms, each locator mechanism including two pairs of contacts spaced apart horizontally and projecting above the said bearing plate through apertures permissive of horizontal movement of said contacts, for contacting the walls of the ports of a collector when in position on the horizontal plate, the unidirectional locator mechanism including means for linearly moving the contacts thereof on a straight fixed line in opposite directions and equally in unison, whereby outward movement of the contacts can engage the outward walls of a diagonal pair of collector ports and uniformly position the collector with respect to the said fixed line, the bi-directional locator mechanism including a horizontal support plate slidably supported adjacent the said bearing plate, the contacts being slidably supported on said plate, and means for linearly moving the contacts in a straight line in opposite directions and equally in unison; the said line having a normal position intersecting the fixed line of the unidirectional locator mechanism at the mid-point of and at right angles thereto, but angularly and horizontally shiftable from said normal position with movement of the support plate, whereby outward movement of the contacts and engagement with this outward wall of the second diagonal pair of collector ports provide horizontal and angular location of the slidable support plate with respect to the fixed line of the unidirectional locator mechanism and the mid-point thereof, the indicator including a fixed position element and a movable element, the movable element being operatively attached to the slidable support of the bidirectional locator mechanism at a position remote from the center thereof, the movable element being vertically aligned with the fixed element when the bidirectional locator mechanism is normally positioned, whereby horizontal and angular displacement of the bidirectional locator mechanism is indicated by displacement of the movable element from said vertical alignment; the second apparatus comprising a foundation upon which is rigidly mounted diaphragm aligners, an immovable enclosing supporting structure including rigid side walls and a level plate above which is mounted an upper ring frame, said diaphragm aligners providing four members for vertically aligning and horizontally locating the diaphragm with respect to the four cylindrical ports of the collector, said collector-collector support frame sub-assembly being supported upon the top horizontal ring frame above said diaphragm aligners, said ring frame being adapted for receiving and supporting the collector-collector support frame sub-assembly by engaging the ends of the collector support frame, the upper surface of said supporting ring frame also defining a horizontal plane upon which is mounted pillow blocks upon which is scribed two pairs of registration marks defining the intersection of two vertical planes having a fixed relationship to the horizontal placement of the diaphragm aligner whereby a completed collector-collector support frame sub-assembly can be laterally and vertically aligned for assembly and for the succeeding aging and aligning steps; each diaphragm aligner including a vertically movable horizontal frusto-conic section converging upwardly and adapted to support a diaphragm by engaging the bottom extremity thereof, and centering blocks radially, equally, and simultaneously movable such that the terminus of each of the blocks be on points defining a horizontal circle which can be varied in diameter, said circle lying in a plane above the said frusto-conic section, the distance of said plane above the frusto-conic section being substantially equal to about the length of a diaphragm, whereby a diaphragm can be elevated, and its bottom and top portions horizontally positioned by said frusto-conic section and said centering blocks respectively, and mechanism for elevating the said frusto-conic section and for providing radial movement of the said centering blocks in unison.

References Cited in the file of this patent

UNITED STATES PATENTS

| | | |
|---|---|---|
| 2,390,115 | McNitt | Dec. 4, 1945 |
| 2,423,714 | Leonard | July 8, 1947 |
| 2,893,940 | Smith | July 7, 1959 |